(12) United States Patent
Dabov et al.

(10) Patent No.: US 10,300,545 B2
(45) Date of Patent: May 28, 2019

(54) LOW-PROFILE MECHANICAL RETENTION

(71) Applicant: Snap Inc., Venice, CA (US)

(72) Inventors: Teodor Dabov, Los Angeles, CA (US); John Bernard Ardisana, II, Torrance, CA (US); Ashutosh Y. Shukla, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/782,526

(22) Filed: Oct. 12, 2017

(65) Prior Publication Data

US 2019/0111508 A1 Apr. 18, 2019

(51) Int. Cl.
| | |
|---|---|
| *H01H 3/12* | (2006.01) |
| *B23K 1/00* | (2006.01) |
| *B23K 1/19* | (2006.01) |
| *H01R 12/50* | (2011.01) |
| *H01R 13/426* | (2006.01) |
| *B23K 33/00* | (2006.01) |
| *B23K 101/36* | (2006.01) |

(52) U.S. Cl.
CPC .............. *B23K 1/0016* (2013.01); *B23K 1/19* (2013.01); *B23K 33/00* (2013.01); *H01R 13/426* (2013.01); *H01R 23/68* (2013.01); *B23K 2101/36* (2018.08)

(58) Field of Classification Search
CPC ...................................................... H01H 13/14
USPC ................................................ 200/341, 345
See application file for complete search history.

(56) References Cited

U.S. PATENT DOCUMENTS

| | | | | |
|---|---|---|---|---|
| 631,892 | A | * | 8/1899 | Johnson ............. H01R 13/6485 200/341 |
| 3,715,708 | A | * | 2/1973 | Lloyd .................... H01R 24/40 439/675 |
| 3,783,607 | A | * | 1/1974 | Feurer .................... G04B 19/30 368/290 |
| 3,977,907 | A | * | 8/1976 | Roth ..................... H01M 2/105 429/121 |
| 4,394,059 | A | * | 7/1983 | Reynolds ........... G03G 15/6538 29/623.1 |
| 4,400,594 | A | * | 8/1983 | Serras-Paulet .......... H01H 5/02 200/5 A |
| 4,613,736 | A | | 9/1986 | Shichijo et al. |
| 5,046,971 | A | * | 9/1991 | Ruggiero ........... H01R 43/0207 29/843 |

(Continued)

OTHER PUBLICATIONS

"International Application Serial No. PCT/US2018/055268, International Search Report dated Jan. 25, 2019", 4 pgs.

(Continued)

*Primary Examiner* — Neil Abrams
(74) *Attorney, Agent, or Firm* — Schwegman Lundberg & Woessner, P.A.

(57) ABSTRACT

An assembly of mechanical components includes a solder joint between two metal components. A mounted component is retained on one side of a support structure by a solder joint on the other side of the support structure between a retainer and a connector that is fast with the mounted component and extends through the support structure. The retainer is of sheet metal construction, so that a height of the solder joint is no more than the thickness of the retainer, thus providing a low-profile joint. The assembly may be in the form of a movable push button for control of an electronic device.

19 Claims, 8 Drawing Sheets

(56) References Cited

U.S. PATENT DOCUMENTS

| | | | | |
|---|---|---|---|---|
| 5,664,973 | A | * | 9/1997 | Emmert ............... H01R 12/585 |
| | | | | 320/115 |
| 7,034,237 | B2 | * | 4/2006 | Ferri .................. H01R 13/6485 |
| | | | | 200/341 |
| 7,361,064 | B2 | * | 4/2008 | Chien ................ H01R 13/2471 |
| | | | | 439/824 |
| 8,279,588 | B2 | * | 10/2012 | Rivera .................. G06F 1/1626 |
| | | | | 200/568 |
| 8,651,900 | B1 | * | 2/2014 | Hsu .................... H01R 13/2421 |
| | | | | 439/700 |
| 2009/0190026 | A1 | | 7/2009 | Chen |
| 2009/0301852 | A1 | | 12/2009 | Keist et al. |
| 2011/0255259 | A1 | | 10/2011 | Weber et al. |
| 2013/0250233 | A1 | | 9/2013 | Blum et al. |

OTHER PUBLICATIONS

"International Application Serial No. PCT/US2018/055268, Written Opinion dated Jan. 25, 2019", 8 pgs.

* cited by examiner

LOW-PROFILE MECHANICAL RETENTION

BACKGROUND

Many mechanical assemblies include the mounting of components on a framework or housing in an environment where there are significant constraints not only on the physical dimensions of a mounting or retention mechanism for mounted components. Such applications often additionally present considerable difficulties with respect to access for assembly.

Mechanical retention mechanisms for such applications, such as machine screws or heat-stakes, have physical dimensions and/or access requirements such that the retention mechanism itself imposes size restraints on other components of the assembly. This is often the case in the construction of physical components for electronic devices, particularly where space is at a premium such as in wearable electronic devices. Non-mechanical solutions, such as gluing or laser welding, are however often non-viable options due to unreliability, long-term deterioration of the connection, additional complexity in tooling, and/or cost considerations.

BRIEF DESCRIPTION OF THE DRAWINGS

Various ones of the appended drawings merely illustrate example embodiments of the present disclosure and cannot be considered as limiting its scope. To facilitate collation of numbered items in the description to the drawings, the first digit of each numbered item corresponds to the figure in which that item first appears. In the drawings:

FIG. 4B is a schematic three-dimensional view of the housing assembly before engagement of a retainer ring with a connector forming part of the example button assembly. FIG. 4C corresponds to FIG. 4B, showing the retainer ring being positioned in engagement with the connector. FIG. 4D shows a view corresponding to FIG. 4C, illustrating the formation of solder joints between the retainer ring and the connector by use of a solder iron.

The headings provided herein are merely for convenience and do not necessarily affect the scope or meaning of the terms used.

DETAILED DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

One aspect of the disclosure provides for utilizing a solder joint or connection as a mechanical joint. As will be illustrated with reference to the example embodiment that follows, such a solder joint, e.g., between plate metal components, provides for a low height bond that allows a system of which it forms part to substantially maximize available space for other components.

Figure 1:
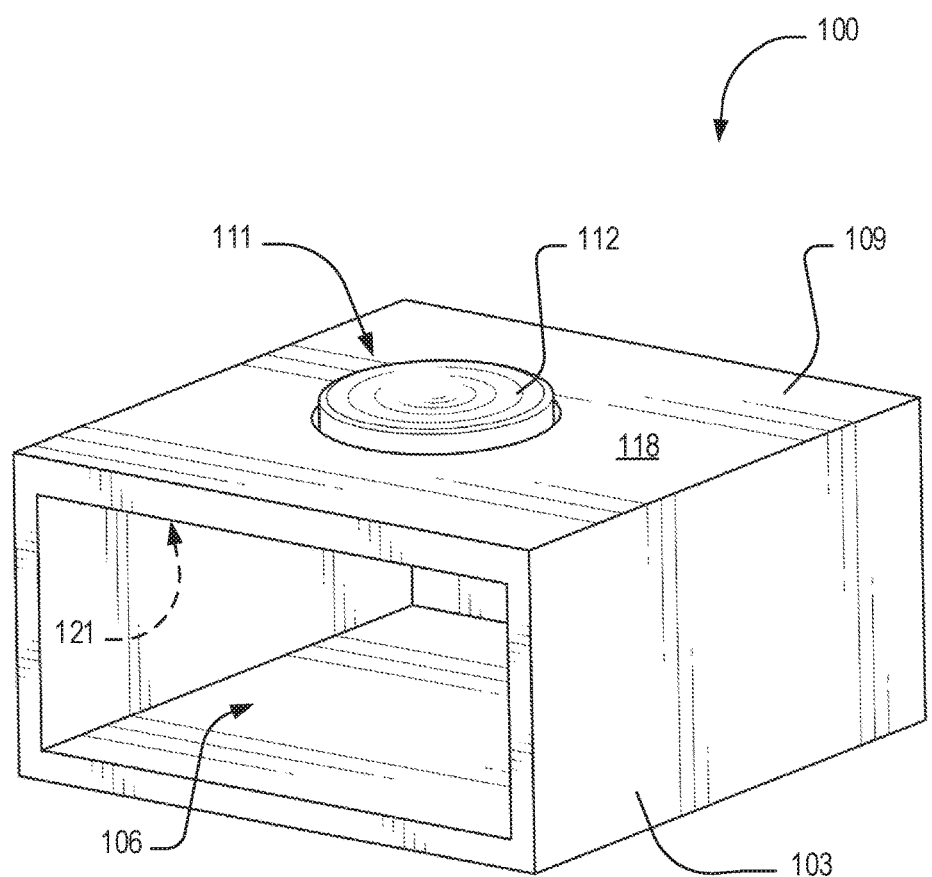
FIG. 1 is a three-dimensional view of a housing assembly that includes a low-profile mechanical retention mechanism, according to one example embodiment
Figure 6:
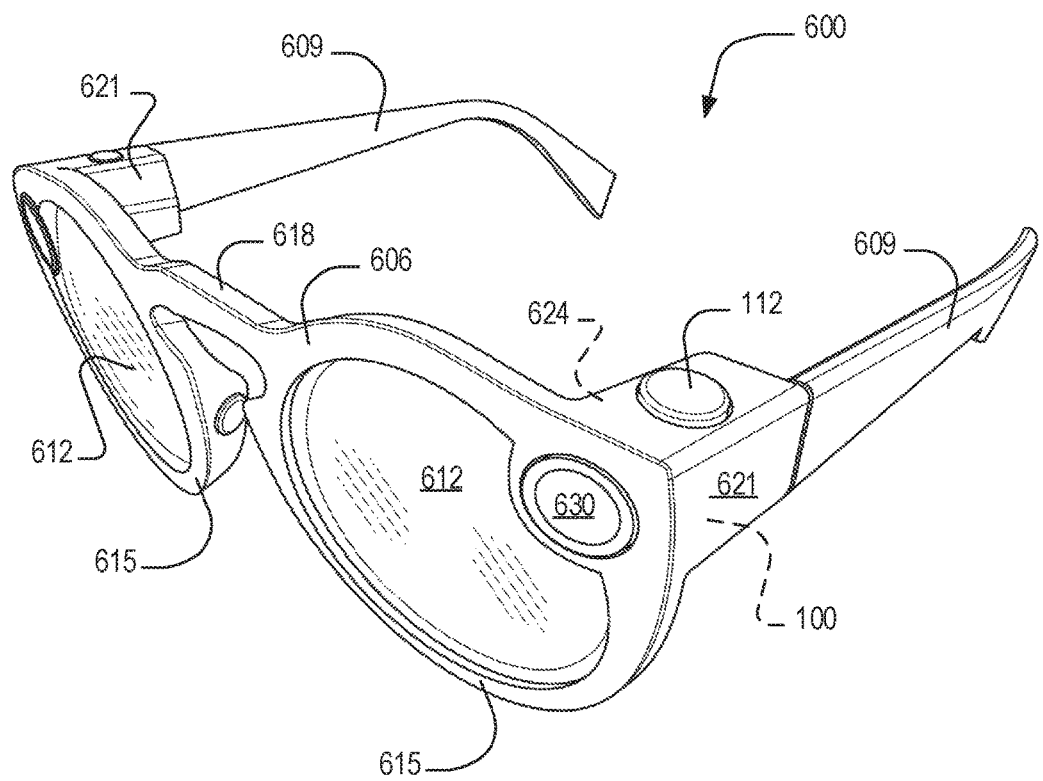
FIG. 6 is a schematic three-dimensional view of an eyewear device that includes an assembly analogous to that described with reference to FIGS. 1-5.

FIG. 1 shows an assembly according to one example embodiment, in this example being a housing assembly 100 for button-controllable electronics to be incorporated in an electronics-enabled eyewear device such as the example pair of smart glasses 600 illustrated in FIG. 6. The housing assembly 100 comprises a framework in the example form of a generally box-shaped housing 103 that defines a housing cavity 106 in which electronic components are to be housed.

The housing assembly 100 further includes a mounted component in the example form of a button 112 mounted on the housing 103 for allowing user control of the electronics located within the housing cavity 106, in use. As will be described below, the button 112 forms part of a button assembly 111 that includes a low-profile solder connection by which the button 112 is mounted on the housing 103. As can be seen in FIG. 1, the housing 103 includes a frame wall on which the button 112 is mounted, in this case being an operatively uppermost wall 109 defining a roof of the housing cavity 106. The roof wall 109 has an exterior surface 118 on an outer or obverse side, and has an opposite interior surface 121 on an inner or reverse side.

Figure 2A:
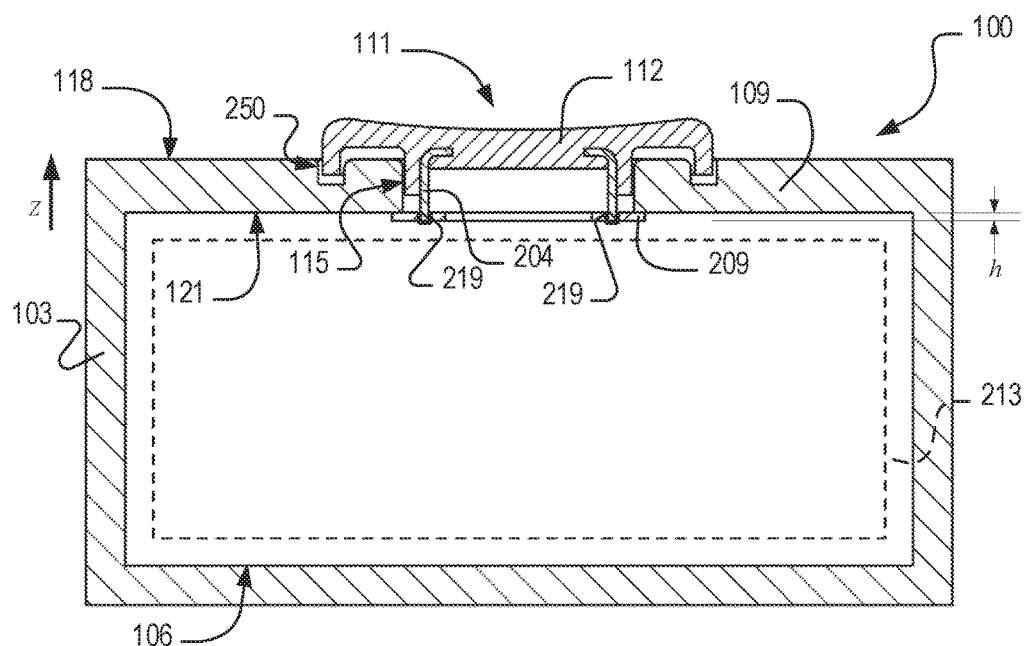
FIGS. 2A and 2B are cross-sectional side views of the example housing mechanism of FIG. 1, an example mounted component in the form of a button mounted to a housing by a low-profile soldered retention mechanism according to one example embodiment being shown in FIG. 2A in a default position, and being shown in FIG. 2B in a depressed position.
Figure 2B:
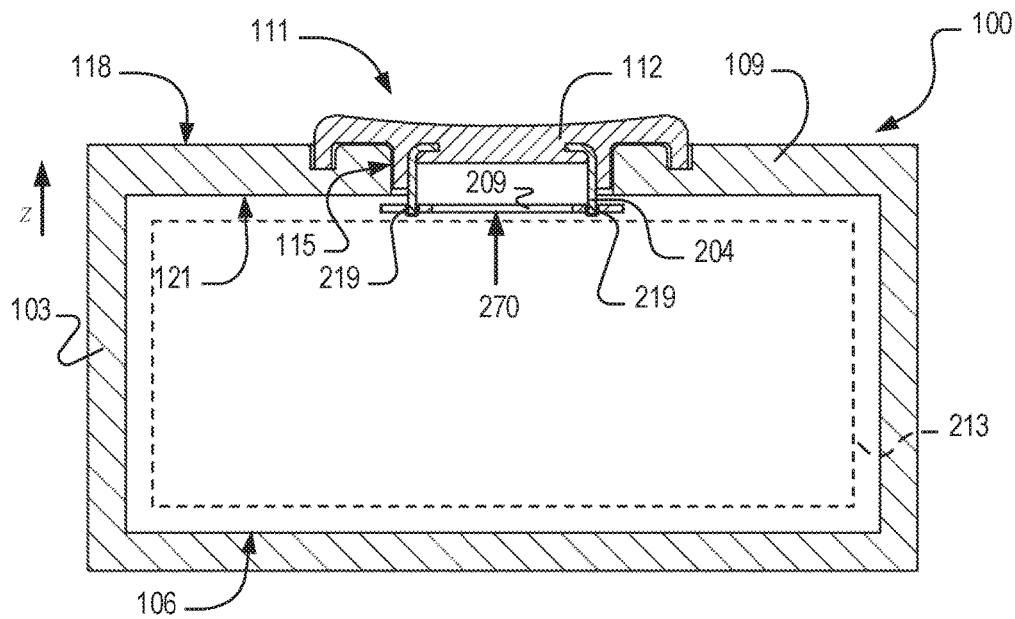

As illustrated schematically in FIGS. 2A and 2B, the button assembly 111 is mounted on the roof wall 109 to be displaceable in a direction transverse to the roof wall 109 (in the orientation of FIGS. 2A and 2B, being movable relative to the roof wall 109 in the up-and-down direction, indicated as the z-dimension), allowing user control of electronic components 213 located in the housing cavity 106. In FIG. 2A, the button assembly 111 is shown in a default or dormant condition, while the button assembly 111 in FIG. 2B is shown in a pressed condition in which the button 112 is moved maximally downward by manual user engagement therewith. Although not shown in the drawings, the assembly 100 includes a bias mechanism acting on the button assembly 111 to urge it to the default condition. In some embodiments, the bias mechanism may be provided by interaction of the button assembly with the electronics 213, as indicated by arrow 270 in FIG. 2B. In another embodiment, the bias mechanism may comprise a resilient element or compressions spring arrangement located in a ring recess 250 defined in the upper surface 118 of the roof wall 109.

The physical ambit of the electronic components 213 is shown in broken lines in FIGS. 2A and 2B, from which it will be noticed that the available z-dimensional space for a retention connection to attach the button 112 to the roof wall 109 (here being shown as the distance between the electronic components 213 and the interior surface 121 of the roof wall 109) is extremely limited. In the illustrated example embodiment, the space constraints are particularly severe, considering that due to design constraints imposed by the eyewear device 600 in which the housing assembly 100 is to be incorporated, the available z-dimensional spacing between the roof wall 109 and the electronics 213 is here about 1 mm. Considering that this spacing is to allow also for travel of the button assembly, the value of limiting the z-dimensional extent of the retention mechanism will be appreciated. Various aspects of an example low-profile retention connection that provides for mounting of the button 112 on the roof wall 109 with minimal z-thickness is further described below.

As can be seen in FIG. 2A, a button opening 115 extends transversely through the roof wall 109, with a cylindrical shank or skirt of the button 112 being complementary to the button opening 115 and being co-axially received therein to be slidable relative to the roof wall 109. The button 112 is in this example embodiment of a hard polymeric plastics material. A generally tubular mild steel connector 204 is embedded at its operatively upper end in the plastics material of the button 112, projecting away from the button 112 such that its distal end is located somewhat beyond the interior surface 121 of the roof wall 109. Observe that the embedded end of the connector 204 is flattened or bent inwards to promote positive connection between the steel connector 204 and the plastic button 112 to which it is thus attached.

A metal retainer in the example form of a mild steel retainer ring 209 (best seen in FIG. 4A) is fastened to the tubular connector 204 on the interior side of the roof wall 109, being oriented substantially parallel to the roof wall 109. In this manner, part of the roof wall 109 is sandwiched between the retainer ring 209 and the button 112, thus retaining the button assembly 111 on the roof wall 109 with limited z-dimensional travel. As will be described in greater detail with reference to FIG. 3-5 below, the retainer ring 209 is attached to the tubular connector 204 by a solder connection consisting in this example embodiment of four circumferentially spaced solder joints 219.

Figure 4A:
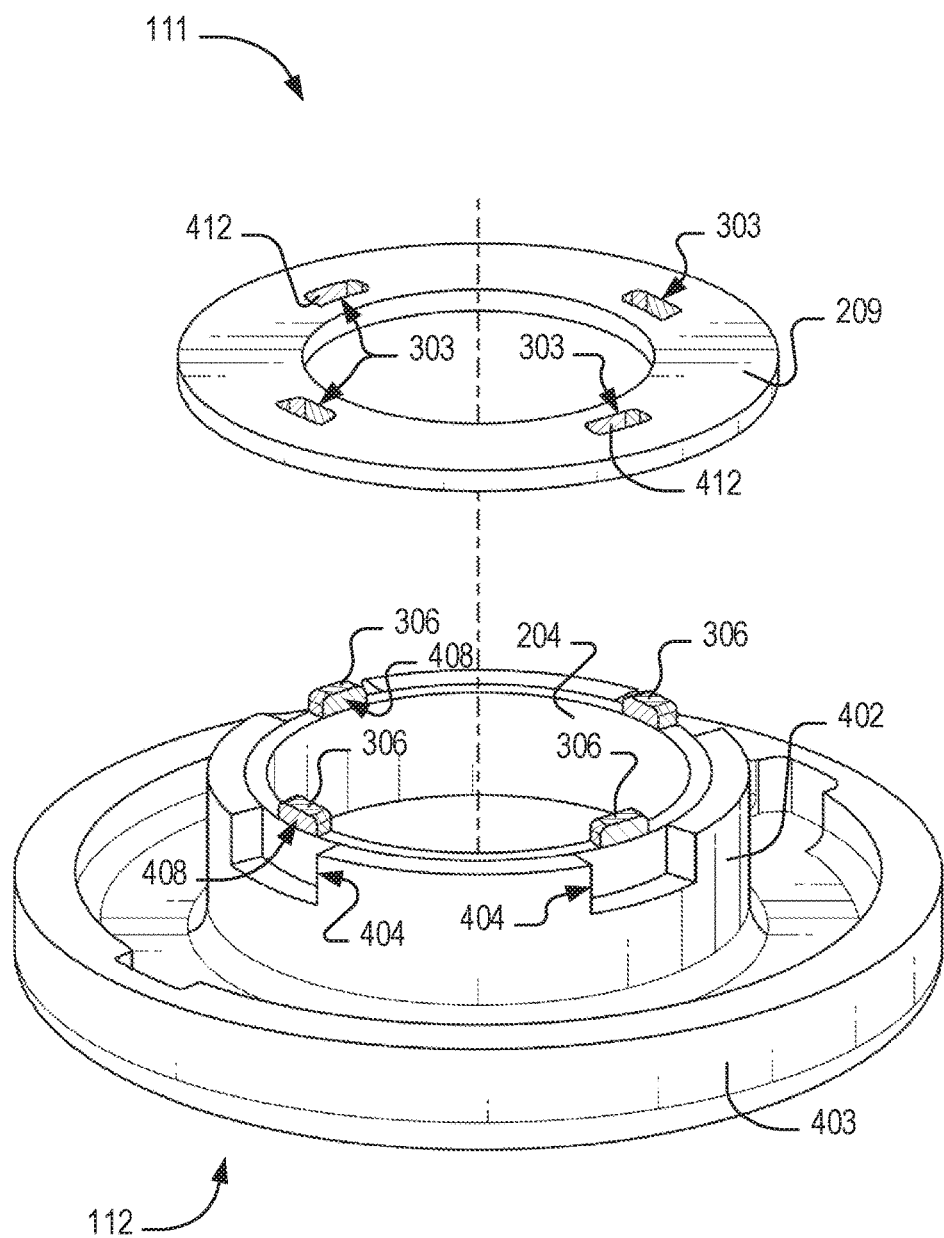
FIGS. 4A-4D are a series of views showing a sequence of operations for assembling a housing assembly according to one example embodiment.
Figure 4B:
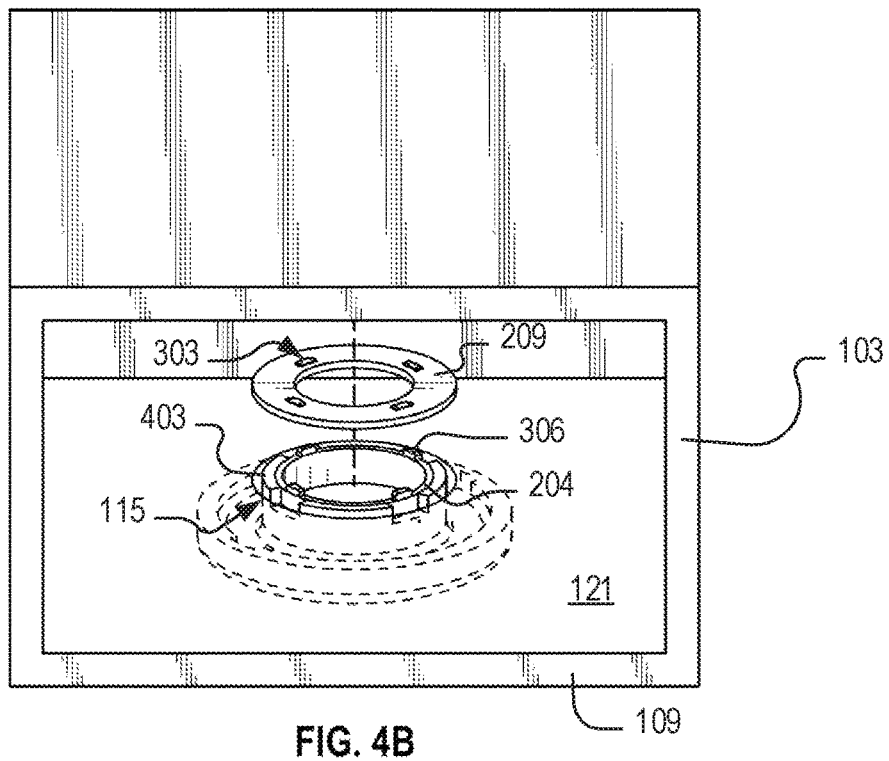

Referring briefly to FIG. 4A (in which the relevant components are shown in exploded view and in an inverted orientation), it will be seen that the retention ring 209 in this example embodiment has a plurality of connection cavities in the example form of four regularly circumferentially spaced mortise holes 303 extending transversely through the sheet metal retainer ring 209. The operatively lower end of the barrel connector 204 (i.e., the upper end in the orientation of FIG. 4A) defines four tenons 306 that are complementary to and correspond in spatial arrangement to the mortise holes 303. Inner surfaces 412 of the mortise holes 303 are provided with a nickel coating, thereby forming respective solder-promoting surfaces. The tenons 306 are likewise nickel-coated, providing solder-promoting surfaces on the tenons 306. For clarity of illustration, the solder surfaces 408 and 412 are hatched in FIG. 4A. Observe that the remainder of the exposed metal surfaces of the connector ring 209 and the connector 204 are uncoated. In this manner, the coated surfaces 408, 412 define target zones for the respective solder joints that are to be formed in overlapping regions of the retainer ring 209 and the connector 204, when the tenons 306 are received in the complementary mortise holes 303.

Figure 3:
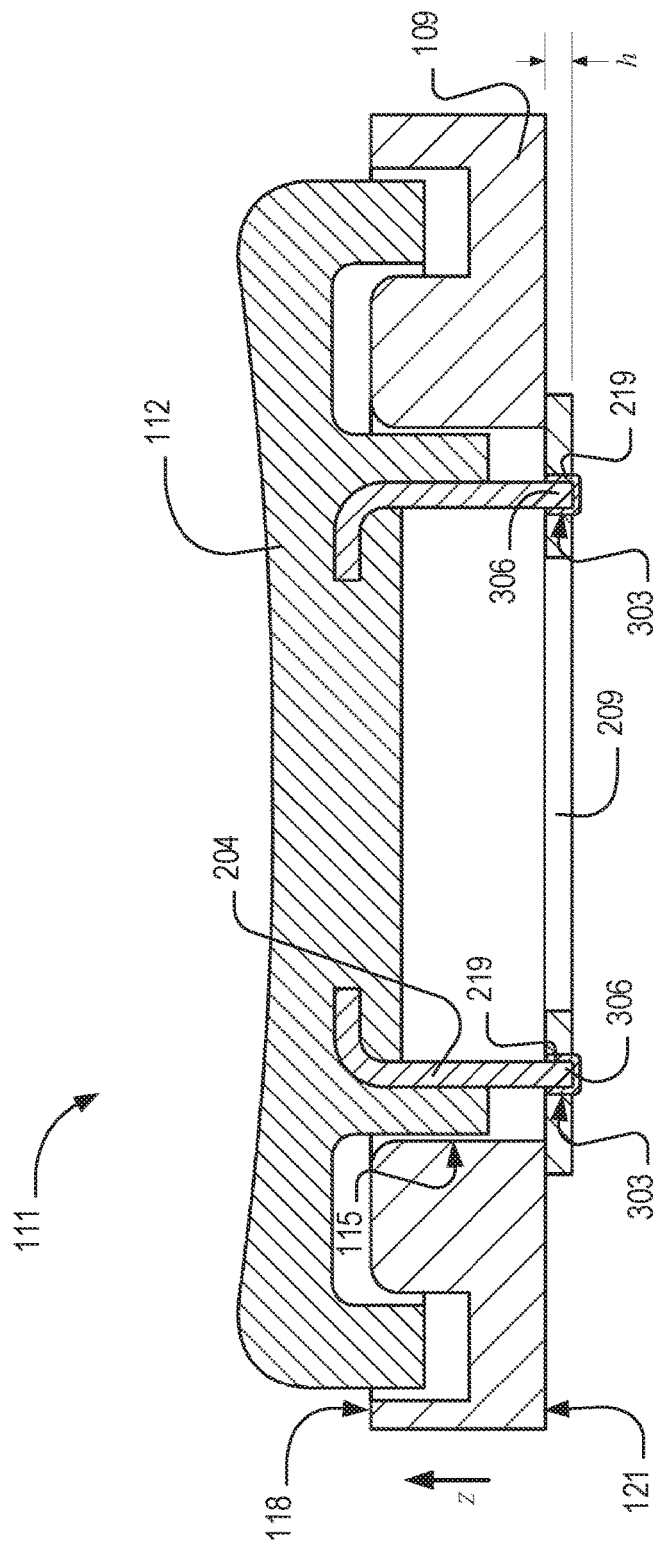
FIG. 3 is a cross-sectional side view, on an enlarged scale, of part of the housing assembly of FIG. 1, according to an example embodiment.

Turning now to FIG. 3, therein is shown the button assembly 111 mounted on the housing wall 109 and being disposed in the default condition, in which the retainer ring 209 bears against the inner surface 121 of the roof wall 109. Note that the tenons 306 are a loose fit in the corresponding mortise holes 303, with solder material of the respective solder joints 219 attaching to the parallel solder-promoting interface surfaces 408, 412 of the connector 204 and the retainer ring 209 respectively. The solder joints 219 are thus in their dimensional extent (also referred to herein as the height of the solder joints 219) restricted substantially to the thickness dimension of the sheet metal retaining ring 209. In this example embodiment, the thickness of the retainer ring 209 is about 0.2 mm, so that the low-profile soldered connection of the example embodiment similarly has a z-dimensional height (h) of about 0.2 mm. Referring again briefly to FIGS. 2A and 2B, it will be seen that this relatively low profile of the retention mechanism allows for mounting the button 112 on the housing 103 with relatively minimal effects on available space for the electronic components 213 in the housing cavity 106, when compared to existing mounting mechanisms for such applications.

An example method of manufacturing the housing assembly 100 according to the previously described example embodiment will now be briefly described with reference to FIGS. 4 and 5. As described previously, FIG. 4A shows the button assembly 111 in pre-assembled condition and in inverted orientation relative to its operative orientation illustrated in FIGS. 1-3. Prior to assembly, the solder-promoting surfaces 408, 412 are provided on the barrel connector 204 and the retainer ring 209 by applying the targeted nickel layer or coating previously described. In this example, the nickel layers are deposited by brush application, but in other embodiments the solder-promoting surfaces 408, 412 can be formed in any suitable manner, such as dipping or electroplating.

The inverted orientation of the FIG. 4A is the orientation in which the retainer ring 209 is in this example embodiment soldered to the tubular connector 204, thus utilizing gravity to promote filling of available spaces between the parallel interface surfaces of the tenons 306 and the mortise holes 303, and thereby promoting proper solder attachment to the nickel-coated solder surfaces 408, 412. To this end, a hollow cylindrical skirt portion 402 that projects from a head 403 of the button 112 and within which the barrel connector 204 is co-axially located has a circumferentially spaced series of recesses 404 in register with and located immediately below the respective tenons 306 of the connector 204. These recesses 404 provides evacuation space for draining of excess solder from the mortise holes 303 during assembly.

Figure 4C:
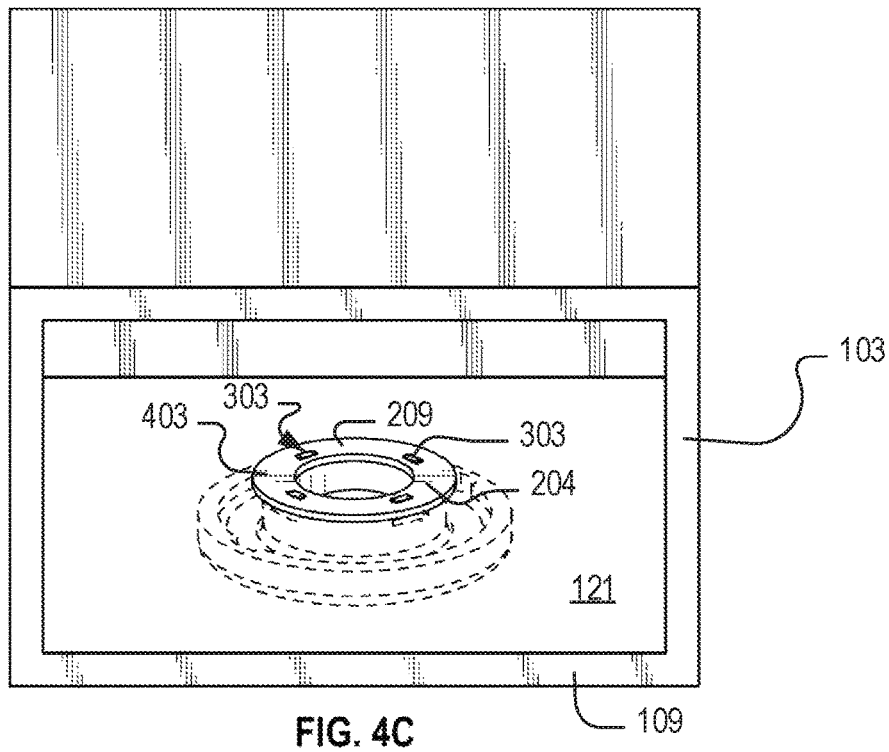

In a first step of assembly (FIG. 4B), the housing 103 is placed on a substantially horizontal support surface in an inverted position, with the button 112 located on the housing 103 such that the cylindrical button skirt 403 is co-axial with and extends through the button opening 115. In this position, the distal end of the barrel connector 204 is substantially flush with the inner surface 121 of the roof wall 109. Thereafter, as shown in FIG. 4C, the retainer ring 209 is placed flat on the inner surface 121 of the wall 109, the connector tenons 306 being received in the complementary mating mortise holes 303 with sufficient clearance between the closely spaced, parallel solder-promoting surfaces 408, 412 to receive solder material therein.

Figure 4D:
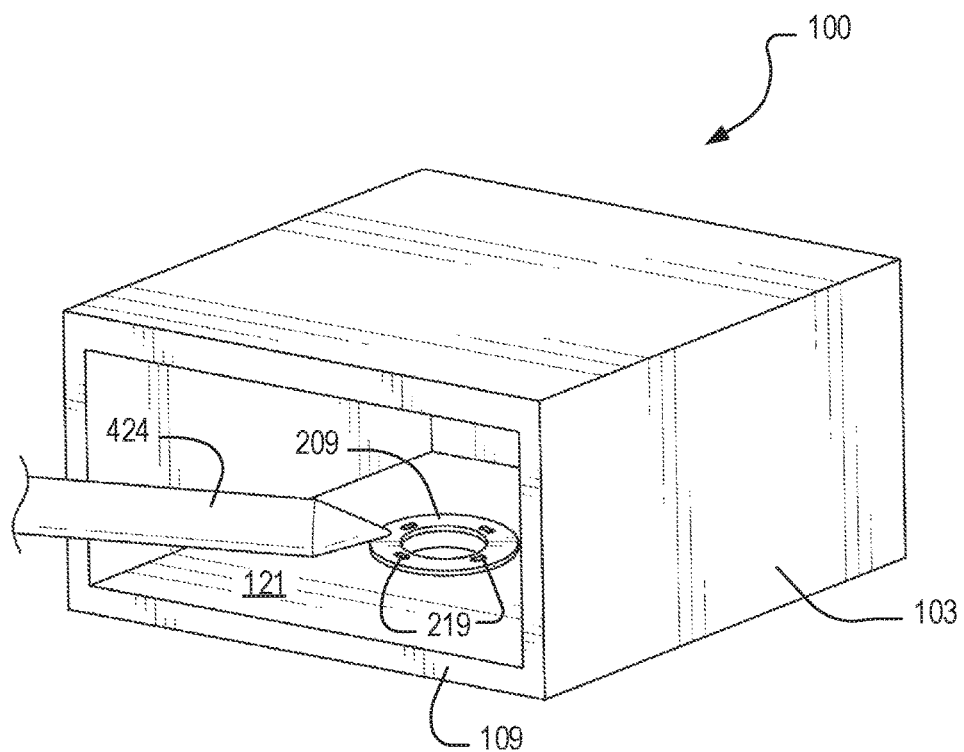

As shown in FIG. 4D, a hand solder iron 424 and solder wire (not shown) in this condition accesses the mortise holes 303 via an open mouth of the housing 103, depositing molten solder material in the respective mortise holes 303. The solder material flows under gravity into the clearance space between the walls of the mortise holes 303 and the respective tenons 306, and there solidifies, thus creating a substantially permanent connection between the retainer ring 209 and the connector 204. In this example embodiment, Tin-Silver-Copper solder is used, but any suitable solder material may be used in other embodiments. Note that the provision of the respective solder-promoting surfaces 408, 412 promotes creation of the solder joints 219 at the target interface surfaces defined by the respective solder-promoting surfaces 408, 412. This is due in part to the relatively poor solderability of typical steel sheet metal, which inhibits adherence of the solder material to either the connector 204 or the retainer ring 209 outside of the solder-promoting surfaces 408, 412.

Figure 5:
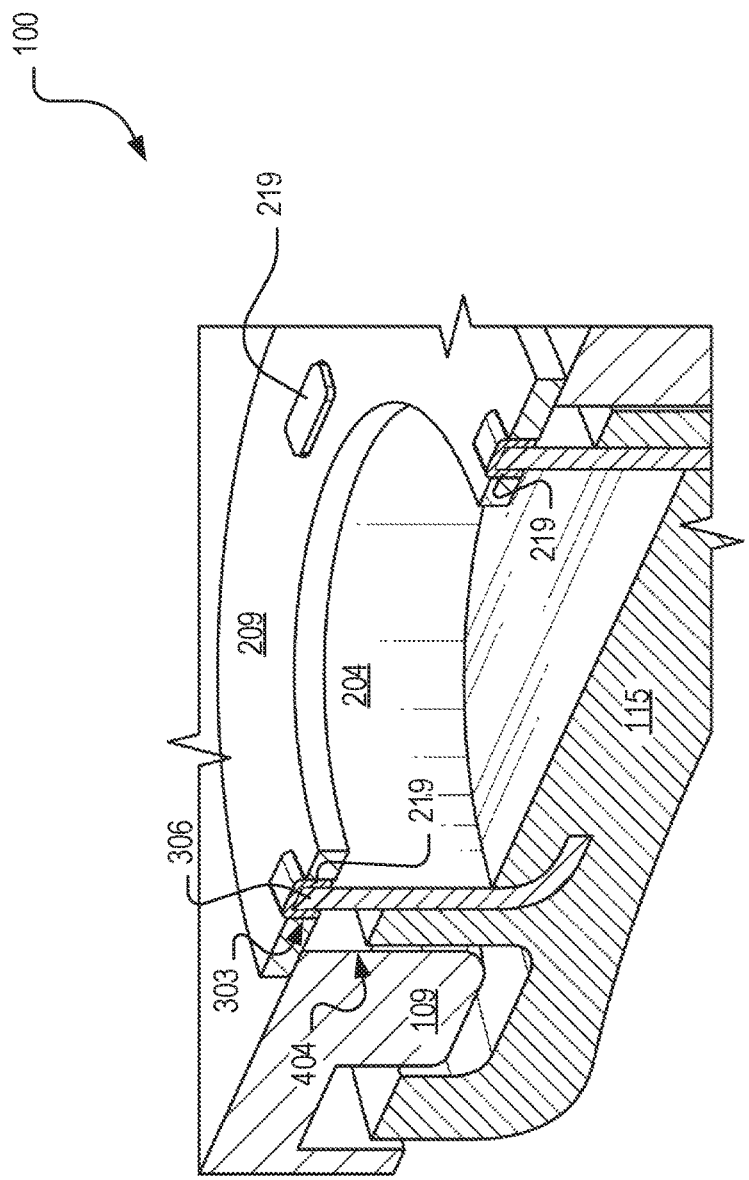
FIG. 5 is a three-dimensional partial cross-section of an assembly in accordance with an example embodiment

FIG. 5 shows a two-dimensional cross-sectional view of two of the solder joints 219 after the described assembly oppression. Note that in the FIG. 3 and FIG. 5 of the drawings, each solder joint 219 is shown as comprising solder material not only between the side faces of the tenons 306 and the parallel interface surfaces of the mortise holes 303, but also includes solder material of about equal thickness on the end faces of the tenons 306. Although the illustrated effect may in some instances occur due to surface tension of the solder material in fluid form during soldering, it is somewhat exaggerated in the drawings and is not of significant importance to the structural integrity of the solder joints 219. In many instances, the extent of solder material the solder joints 219 is limited to the z-dimensional overlap between the tenons 306 and the thickness of the retainer ring 209.

After the solder joints 219 have been allowed to set, the electronic components 213 (FIG. 2A) are inserted in the housing 103 that operationally coupled to the button assembly 111 to allow user control of one or more functionalities of the electronics 213 by operation of the button 112. Thereafter, the final housing assembly 100 is incorporated in an end product device, in this example embodiment being an eyewear device in the example form of a pair of smart glasses 600 illustrated schematically in FIG. 6.

FIG. 6 shows a front perspective view of an eyewear device in the form of a pair of smart glasses 600 that includes a housing 100 including the low-profile soldered retention mechanism as described with reference to the example embodiment of FIGS. 1-5. The glasses 600 include a body comprising a front piece or frame 606 and a pair of temples 609 connected to the frame 606 for supporting the frame 606 in position on a user's face when the glasses 600 are worn. The frame 606 can be made from any suitable material such as plastics or metal, including any suitable shape memory alloy.

The glasses 600 have a pair of optical elements in the form of a pair of lenses 612 held by corresponding optical element holders in the form of a pair of rims 615 forming part of the frame 606. The rims 615 are connected by a bridge 618. In other embodiments, one or both of the optical elements can be a display (e.g., to provide a virtual reality display), a display assembly, or a lens and display combination (e.g., to provide augmented reality functionalities).

The frame 606 includes a pair of end pieces 621 defining lateral end portions of the frame 606. In this example, a variety of electronics components are housed in one or both of the end pieces 621, the housing assembly 100, with its internal electronics 213 is integrated in the lateral end piece 621. The button 112 of the housing assembly 100 projects through a complementary opening in the end piece 621 to be accessible for user operation. In some embodiments, the frame 606 is formed of a single piece of material, so as to have a unitary or monolithic construction. In some embodiments, the whole of the body (including both the frame 606 and the temples 609) can be of the unitary or monolithic construction.

The temples 609 are coupled to the respective end pieces 621. In this example, the temples 609 are coupled to the frame 606 by respective hinges so as to be hingedly movable between a wearable mode (as shown in FIG. 6) and a collapsed mode in which the temples 609 are pivoted towards the frame 606 to lie substantially flat against it. Each of the temples 609 includes a front portion that is coupled to the frame 606 and a suitable rear portion for coupling to the ear of the user.

The glasses 600 has onboard electronics 624 including a computing device, such as a computer, which can in different embodiments be of any suitable type so as to be carried by the eyewear device body. In some embodiments, various components comprising the onboard electronics 624 are at least partially housed in one or both of the temples 609. As mentioned, various components of the onboard electronics 624 are in this example embodiment housed in the housing 100 within the lateral end pieces 621 of the frame 606. The onboard electronics 624 includes one or more processors with memory, wireless communication circuitry, and a power source (this example embodiment being a rechargeable battery, e.g. a lithium-ion battery). The onboard electronics 624 comprises low-power, high-speed circuitry, and, in some embodiments, a display processor. Various embodiments may include these elements in different configurations or integrated together in different ways.

As mentioned, the onboard electronics 624 includes a rechargeable battery. In some embodiments, the battery is disposed in one of the temples 609. In this example embodiment, however, the battery is housed in one of the end pieces 621, being electrically coupled to the remainder of the onboard electronics 624.

The glasses 600 is camera-enabled, in this example comprising a camera 630 mounted in one of the end pieces 621 and facing forwards so as to be aligned more or less with the direction of view of a wearer of the glasses 600. The camera 630 is configured to capture digital as well as digital video content. Operation of the camera 630 is controlled by a camera controller provided by the onboard electronics 624, image data representative of images or video captured by the camera 630 being temporarily stored on a memory forming part of the onboard electronics 624. In some embodiments, the glasses 600 can have a pair of cameras 630, e.g. housed by the respective end pieces 621.

The glasses 600 further include one or more input and output devices permitting communication with and control of the camera 630. In particular, the glasses 600 include one or more input mechanisms for enabling user control of one or more functions of the glasses 600. In this embodiment, the input mechanism comprises the button 112. In the current example embodiment, a photo capture command can be issued by a single, relatively short button press (e.g., shorter than a second), while a video capture command can be issued by a press-and-hold action.

It is a benefit of the described method of mounting the button 112 on the housing 103 that it provides a low profile (i.e., relatively small z-thickness) retention solution for bonding to metal parts as part of the button assembly 111. It will be seen from the description of example embodiments of that such assemblies are often located in narrow, difficult to access cavities, such as the housing cavity 106 of the example embodiment. In such relatively small, limited access environments, conventional alternative methods of attachment present various challenges that are avoided or overcome by the disclosed connection methods. For example, alternative methods like using machine screws, a heat stake, or laser welding are frustrated by restricted access, and require additional complexity in tooling, fixturing, and cost. Adhesive attachments like gluing are insufficiently robust, being prone to deterioration or creep over time, particularly when exposed to heat such as that generated in use by the electronic components 213.

Problematically, many such conventional attachment methods almost invariably adds significantly to the z-dimensional extent of the mounted assembly (e.g., to the button assembly 111) and/or requires more space to implement. In contrast, the disclosed detection mechanisms uses solder joints 219 as a mechanical joint. The low-height bound provided by the solder joints 219 allows the system to substantially maximize space available for other components. Thus, the use of the disclosed low-profile (in some cases being substantially zero-height) solder bonding in spatially restricted or difficult to access systems allows greater mechanical freedom, better packaging, and improved miniaturization of consumer products. In some cases, use of the disclosed techniques enables a metal-to-metal bond where screw access is impossible, and where providing larger heatstake or ultrasonic welding fixtures are not feasible or practical.

Note that although the low-profile soldered connection for retaining a mounted component on a support structure is in this example embodiment described with reference to a housing for electronics to be incorporated in the example eyewear device 600, the mounting and retention techniques described herein can be implemented in a variety of different applications. The disclosed mechanism is particularly useful in applications where z-dimensional space is at a premium, with minimal additional space restriction being provided by the low profile soldered joint.

Overview

From the above-described example embodiments, it will be observed that one aspect of the disclosure provides for an assembly comprising:
a framework that includes a frame wall having an obverse side and an opposite reverse side;
a mounted component that is mounted on the frame wall such as to be exposed on the obverse side of the frame wall;
a metal connector that is fast with the mounted component and that projects from the mounted component transversely through at least part of the frame wall;
a metal retainer that is located on the reverse side of the frame wall such that part of the frame wall is sandwiched between the mounted component and the retainer; and
a solder joint that fastens the retainer to the connector, thereby retaining the mounted component on the frame wall.

In some embodiments, the retainer is of sheet metal construction oriented such that a thickness dimension of the retainer is transverse to the frame wall at the mounted component, e.g. comprising a sheet steel ring lying flat against the frame wall. In such embodiments, the retainer has one or more connection cavities or openings in which part of the connector is received tenon/mortise-fashion, the solder joint being located at least in part in the one or more cavities. The solder joint in such embodiments has a height dimension that is oriented transversely to the frame wall at the mounted component, with the height dimension coinciding substantially with an overlap between the retainer and the connector, so that the height dimension of the solder joint is substantially equal to or smaller than the thickness dimension of the retainer. In this manner, the height or z-dimensional thickness of the joint between the retainer and the connector is defined by the thickness of the sheet metal retainer, thus being small relative to the size of the mounted component, the connector, and the frame wall. To this end, the connector projects through the retainer substantially no further than a major outer face of the retainer on the reverse side.

In some embodiments, at least one of the retainer and the connector includes a solder-promoting surface that coincides with an overlap between the connector and the retainer, the solder joint being of a different metal material than both the connector and the retainer, and the solder joint attaching to the solder-promoting surface. In some embodiments, both the connector and the retainer have respective solder-promoting surfaces, the solder joint attaching to the solder-promoting surfaces of both the retainer and the connector. Provision of the solder-promoting surfaces effectively allows for targeting the specific location of the solder joints. The solder-promoting surfaces on the connector and the retainer respectively are in some embodiments localized metal coatings, each localized coating for example comprising a nickel coating.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed, is:

1. An assembly comprising:
a framework that includes a frame wall having an obverse side and an opposite reverse side, the framework defining a housing cavity;
electronics components located in the housing cavity;
a mounted component that is mounted on the frame wall such as to be exposed on the obverse side of the frame wall, the mounted component being a button member that is operable to control one or more functionalities of the electronics components;
a metal connector that is fast with the mounted component and that projects from the mounted component transversely through at least part of the frame wall;
a metal retainer that is located on the reverse side of the frame wall such that part of the frame wall is sandwiched between the mounted component and the retainer; and
a solder joint that fastens the retainer to the connector, thereby retaining the mounted component on the frame wall.

2. The assembly of claim 1, wherein
the retainer is of sheet metal construction oriented such that a thickness dimension of the retainer is transverse to the frame wall at the mounted component; and
wherein the retainer has one or more connection cavities in which part of the connector is received, the solder joint being located at least in part in the one or more cavities.

3. The assembly of claim 2, wherein the solder joint has a height dimension that is oriented transversely to the frame wall at the mounted component and that coincides substantially with an overlap between the retainer and the connector, the height dimension of the solder joint being substantially equal to or smaller than the thickness dimension of the retainer.

4. The assembly of claim 2, wherein the connector projects through the retainer substantially no further than a major outer face of the retainer on the reverse side.

5. The method of claim 2, wherein at least one of the retainer and the connector includes a solder-promoting surface that coincides with an overlap between the connector and the retainer, the solder joint being of a different metal material than both the connector and the retainer, and the solder joint attaching to the solder-promoting surface.

6. The method of claim 5, wherein both the connector and the retainer have respective solder-promoting surfaces, the solder joint attaching to the solder-promoting surfaces of both the retainer and the connector.

7. The method of claim 6, wherein the solder-promoting surfaces on the connector and the retainer respectively are localized metal coatings.

8. The method of claim 7, wherein each localized coating comprises a nickel coating.

9. The method of claim 2, wherein the solder joint connects the connector and the retainer at substantially parallel interface surfaces that are oriented in a direction transverse to the frame wall at the mounted component.

10. The method of claim 9, wherein the assembly comprises a plurality of solder joints located at respective interface surfaces between the retainer and the connector.

11. The assembly of claim 10, wherein:
the retainer defines a plurality of mortise holes; and
wherein the connector includes a corresponding plurality of tenons complementary to and matingly, received in the plurality of mortise holes of the retainer, each tenon being connected to the retainer in the corresponding mortise hole by a respective solder joint.

12. The assembly of claim 1, wherein the mounted component is displaceably mounted on the frame wall to allow travel thereof in a direction transverse to the frame wall, the extent of travel of the mounted component away from the frame wall being limited by abutment of the retainer against the frame wall on the reverse side thereof.

13. The assembly of claim 12, wherein the assembly further comprises a biasing mechanism to bias the mounted component away from the frame wall.

14. The assembly of claim 1, wherein the retainer is located in the housing cavity.

15. The assembly of claim 1, wherein the mounted component is of a polymeric plastics material, the metal connector being partially embedded in the mounted component and projecting from the mounted component towards the reverse side of the frame wall.

16. A method comprising:
positioning a target component on an obverse side of a support structure such that a connector that is fast with the target component projects transversely through the support structure to an opposite, reverse side thereof, the target component being a button;
creating a solder connection between the connector and a metal retainer on the reverse side of the support structure such that part of the support structure is located between the retainer and the target component, thus forming a mechanical retention mechanism by which the target component is mounted on the support structure; and
mounting electronics in a housing cavity defined by the support structure and bordering the retainer such that one or more functionalities of the electronics are controllable by operation of the button.

17. The method of claim 16, wherein the retainer is of sheet metal and defines a plurality of connection openings, the method further comprising receiving a corresponding plurality of connection formations defined by the connector in the respective connection openings, the creating of the solder connection comprising soldering the connection formations in position in the respective connection openings.

18. The method of claim 17, wherein the retainer and the connector are steel components, the method further comprising the prior operation of creating solder-promoting surfaces on interfacing areas of the connection formations and the connection openings.

19. The method of claim 18, wherein the creating of the solder-promoting surfaces comprises applying on the respective areas a metal alloy coating that is more receptive to soldering than the material of the retainer and the connector.

* * * * *

UNITED STATES PATENT AND TRADEMARK OFFICE
CERTIFICATE OF CORRECTION

PATENT NO. : 10,300,545 B2
APPLICATION NO. : 15/782526
DATED : May 28, 2019
INVENTOR(S) : Dabov et al.

Page 1 of 1

It is certified that error appears in the above-identified patent and that said Letters Patent is hereby corrected as shown below:

In the Claims

In Column 9, Line 11, in Claim 1, delete "opposite" and insert --opposite,-- therefor In Column 10, Line 9, in Claim 11, delete "matingly," and insert --matingly-- therefor Signed and Sealed this
Fifteenth Day of December, 2020

Andrei Iancu
*Director of the United States Patent and Trademark Office*